Figure 1:
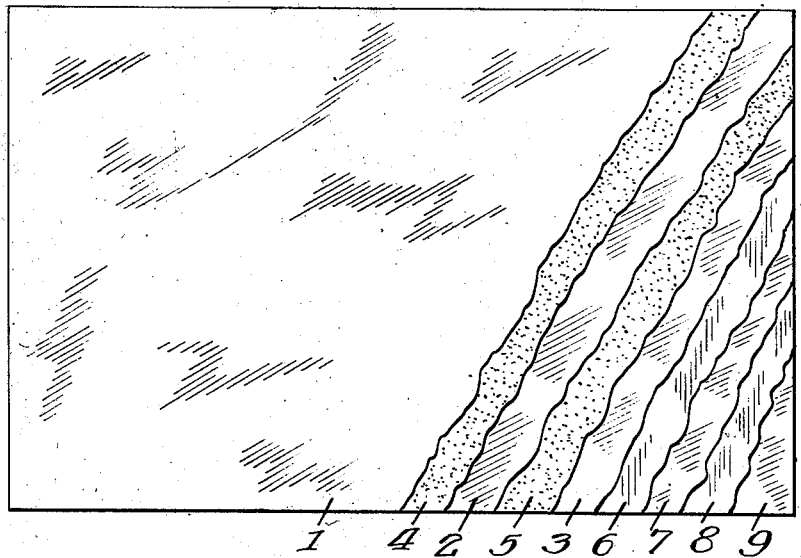

Aug. 5, 1924.                                               1,503,957
O. KRESS
COMPOSITE MOISTUREPROOF BOARD
Filed Nov. 12, 1923

Inventor:
Otto Kress,
By Fisher, Fowle, Clapp & Soans.
Attys.

Patented Aug. 5, 1924.

1,503,957

UNITED STATES PATENT OFFICE.

OTTO KRESS, OF APPLETON, WISCONSIN, ASSIGNOR TO AMERICAN LAKES PAPER COMPANY, A CORPORATION OF DELAWARE.

COMPOSITE MOISTUREPROOF BOARD.

Application filed November 12, 1923. Serial No. 674,254.

*To all whom it may concern:*

Be it known that I, OTTO KRESS, a citizen of the United States, residing at Appleton, county of Outagamie, and State of Wisconsin, have invented certain new and useful Improvements in Composite Moistureproof Board, of which I declare the following to be a full, clear, and exact description, reference being had to the accompanying drawing, forming part of the specification.

My present invention has relation to the improvement of that class of composite moisture-proof board intended for use in forming cartons, containers or caddies, adapted for bakery products, confections or any articles from which moisture is to be excluded or which are to be kept in moist condition.

The invention consists in the features of novelty hereinafter described, illustrated in the accompanying drawing, and particularly pointed out in the claims at the end of this specification.

Figure 2:
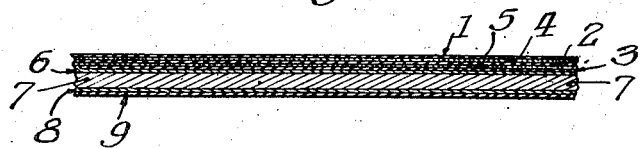

In the drawings:

Figure 1 is a plan view of a sheet of moisture-proof board embodying my invention, parts being broken away for better illustration. Figure 2 is an exaggerated view in vertical section of a portion of the sheet shown in Fig. 1.

In the manufacture of moisture-proof board intended for forming cartons, containers and the like, it has heretofore been proposed to employ a plurality of sheets of cardboard united together by interposed films of asphaltum, sheets of paper being attached to the outer faces of the composite board by any familiar adhesive material, such as paste, glue, silicate of soda, or the like.

In practice, a number of serious objections have been found to a composite board thus made from sheets of paper board. In the first place, paper board cannot be made of as uniform thickness as a sheet of relatively thin paper, hence the surface of the paper board is more or less uneven, with slight humps and hollows which require an excess of asphaltum over that necessary to combine smooth sheets of paper together. Again, the thick film of asphaltum required to unite the paper board is brittle, will not flex or hinge readily and will break down when the finished board is scored and folded to form cartons, so that the cartons are apt to leak moisture at the folds. So, also, the excess of asphaltum required in uniting sheets of paper board is apt in cold weather to cause the composite board to crack, while in hot weather the excess of asphaltum tends to "bleed" or leak from the cut ends of the board.

It has been attempted to overcome these difficulties by applying the asphaltum as a thin film between two thin sheets of paper and then unite the composite sheet so formed to an outer sheet of paper and to a ply or layer of heavy paper board by an adhesive material, such, for example, as sodium silicate. In this way, it has been found possible to obtain a thin, uniform, flexible film of asphalt; but although this procedure cured some of the difficulties before experienced, I have found that while the two-ply sheet made up of layers of paper united by the asphalt film is effectively moisture-proof, it is not efficient to prevent the passage of moisture through the finished board,—that is to say, through the composite board made up of such two-ply sheet united by a suitable adhesive to a heavy paper board or stiffening material, that gives increased body to the sheet. This is because the application of the water solution of the adhesive (such as sodium silicate) to the sheet, and the subsequent evaporation of the water, causes an uneven expansion of the paper body of the composite sheet, which, like any paper sheet, expands when wet with water, to different degrees lengthwise and across the direction in which it passes through the paper machine on which it is made. Also, the film of adhesive material, such as silicate of soda, contracts as it dries. This uneven expansion of the two-ply sheet and the contraction of the silicate film breaks down, at least to a considerable degree, the moisture-proofing film of asphalt, and while the two-ply sheet originally is effectively moisture-proof, the finished composite board is not.

Again, when sodium silicate is used as a means for cementing the two-ply sheet to a sheet of paper that is to form the outer surface of the composite board, it is found that the alkalinity of the silicate attacks the resinous size of the paper sheets employed in the composite board, so that the united sheets lose their water-resisting qualities due to such size. Hence, the finished board will absorb any water with which it comes in contact, and in moist weather will absorb moisture from the air. Again, the alkaline sodium silicate acts on the natural coloring agents of the paper forming the outer sheet or sheets of the board and discolors it. While these last mentioned difficulties will not exist if cements such as starch, glue, dextrine or the like be employed, still all such cements must be applied in a water solution and would, like the silicate, destroy the asphalt film and materially weaken its moisture-proofing quality.

By the present invention, the objections hereinbefore noted are entirely overcome. This result is accomplished primarily by forming a composite sheet consisting of three layers of relatively thin paper (as distinguished from paper board) united together by thin films of asphaltum and this composite three-ply sheet is thereafter cemented by silicate of soda or other well known adhesive material, to one side of a stiffening sheet, preferably a sheet of paper board of much greater thickness and weight than the relatively thin flexible paper sheets, the paper board serving to give the requisite body to the finished product.

In the embodiment of the invention illustrated in the drawing, 1, 2 and 3 designate respectively sheets of comparatively thin, and preferably hard surfaced paper, the weight of which may vary within a considerable range. Assuming the sheets to be 24 x 36 inches, and with 480 sheets to the ream, the weight of the paper of which the sheets 1, 2 and 3 are formed may be between 10 and 100 pounds per ream. "Paper board," as such term is understood in the trade, denotes a paper material not only of greater weight per ream for size 24 x 36 inches, but also denotes a material the surface of which is ordinarily much rougher and more porous than the paper sheets 1, 2 and 3. The films of asphaltum between the paper sheets 1, 2 and 3 are designated as 4 and 5. The three sheets of paper 1, 2 and 3 thus united together by the films of asphaltum 4 and 5 form in effect a moisture proof sheet, which is subsequently attached by a suitable adhesive, such as a film of silicate of soda 6, to a sheet of stiffening material, such as a sheet of paper board 7, that is considerably heavier and thicker than the sheets of paper 1, 2 and 3 and indeed is materially heavier and thicker than the composite sheet formed of the three sheets 1, 2 and 3 of paper with the interposed films of asphaltum. The thickness and weight of the paper board 7 will depend upon the precise weight required for the finished article. To this layer of paper board 7 is preferably attached, as by a film of silicate of soda 8, an inner lining sheet 9 of relatively thin paper, say for example, paper weighing about 40 pounds to the ream, assuming the ream to consist of 480 sheets 24 x 36 inches. Preferably, the three sheets of paper 1, 2 and 3 will differ somewhat in weight, the outermost sheet 1 being preferably materially heavier than the inner sheets 2 and 3 and weighing say from 40 to 60 pounds to the ream, while the inner sheets 2 and 3 are preferably say between 20 and 30 pounds to the ream. The outermost film of asphaltum 4 may also be somewhat heavier than the film 5, the film 4 running say about 20 pounds to the ream, while the film 5 may run about 16 pounds to the ream; but the aggregate weight of these two layers of asphaltum 4 and 5 is much less than the weight of asphaltum heretofore found necessary when the composite board is formed of sheets of paper board united together by films of asphaltum.

The finished moisture-proof board embodying my present invention has the following advantages: It is of great strength and lightness and can be readily scored and folded without breaking the moisture-proof films of asphalt. Only a small amount of asphalt is required and the films will not crack in cold weather nor "bleed" or leak in warm weather. It will also be noticed that the three-ply sheet is quite flexible and can be readily secured to one side of the stiffening paper board by any well known adhesive, such as silicate of soda, starch, glue or the like, applied in the form of watered solutions. But the chief advantage of my improved board is that the finished product is effectively moisture-proof. That is to say, that while the application of silicate of soda or other adhesive to one side only of the three-ply sheet will, for the reasons stated, tend to break down the innermost film 5 of asphaltum, the outer film 4 is protected and will not be thus affected. It will be noted that the three-ply sheet which is first made up is subsequently applied to one side of the stiffening board and forms, or rather its outer ply 1 forms, one surface of the finished board and preferably forms the outer surface of the cartons that will be made from the board. An incidental advantage of this is that the size in the paper forming the outer surface of the carton remains unaffected by the silicate, if silicate be used, and it hence retains its water-resisting properties due to the size. Nor is the outer surface of the carton discolored by the alkali in the silicate.

If desired, the sheet of paper board 7 may have embodied therein, in the process of forming it, gritty fillers such as china clay, talc, asbestine, etc. and this material may serve in cleaning the blades whereby the sheets are cut; or, if preferred, a like gritty filler may be embodied in the sheets of paper; or both the sheet of paper board 7 and the several sheets of paper may have such gritty filler embodied therein.

Obviously, changes may be made in the details set forth without departing from the essentials of the invention as defined in the claims.

Having thus described my invention, what I claim as new and desire to secure by Letters Patent is:—

1. A composite moisture-proof paper board comprising at least one ply of relatively heavy stiffening material, and at least three adjacent plies of relatively light paper that are united by thin films of asphalt and are united by a suitable adhesive to the stiffening material, substantially as described.

2. A composite moisture-proof paper board comprising at least one ply of stiffening paper board and at least three adjacent plies of relatively light, smooth surfaced, flexible paper, one of which forms one of the outer surfaces of the finished board, the adjacent paper plies being united to one another by thin films of asphaltum and to the stiffening paper board by a suitable adhesive, substantially as described.

3. A composite moisture-proof board comprising at least one ply of stiffening board and a plurality of plies of paper united together by asphaltum, the said stiffening board having embodied therein an abrasive in the form of a gritty filler, substantially as described.

4. A composite moisture-proof paper board comprising at least one ply of relatively heavy stiffening material, and at least three adjacent plies of relatively light paper that are united by thin films of asphalt and are united by a suitable adhesive to the stiffening material, an abrasive in the form of a gritty filler being embodied in said paper or stiffening material.

5. A composite moisture-proof paper board comprising at least one ply of stiffening board and at least three adjacent plies of relatively light, flexible paper united to one another by films of asphaltum, one of said plies of paper forming one of the outer surfaces of the finished board, the said stiffening board having embodied therein an abrasive in the form of a gritty filler, substantially as described.

OTTO KRESS.